United States Patent [19]
Williamson et al.

[11] Patent Number: 4,976,094
[45] Date of Patent: Dec. 11, 1990

[54] HARVESTING MACHINERY

[75] Inventors: Robert E. Williamson; Carl M. McHugh; Clarence E. Hood, all of Clemson, S.C.

[73] Assignee: Clemson University, Clemson, S.C.

[21] Appl. No.: 150,244

[22] Filed: Jan. 29, 1988

[51] Int. Cl.$^5$ ............................................. A01D 46/00
[52] U.S. Cl. ...................................... 56/330; 56/328.1; 198/313
[58] Field of Search ........................ 56/330, 329, 328.1, 56/340.1, 331, 327.1; 198/813, 313, 816, 312, 835; 172/311

[56] References Cited

U.S. PATENT DOCUMENTS

| | | | |
|---|---|---|---|
| 3,184,908 | 5/1965 | Rust | 56/330 |
| 3,777,463 | 12/1973 | Claxton | 56/330 |
| 3,901,005 | 8/1975 | Rohrbach et al. | 56/330 |
| 4,077,193 | 3/1978 | Diggs | 56/330 |
| 4,157,005 | 6/1979 | Orlando et al. | 198/313 |
| 4,204,575 | 5/1980 | Richardson et al. | 172/311 |
| 4,241,569 | 12/1980 | Bobard et al. | 56/330 |
| 4,283,906 | 8/1981 | Scudder | 56/330 |
| 4,292,792 | 10/1981 | Burton | 56/330 |
| 4,335,570 | 6/1982 | Fitzmaurice | 56/330 |
| 4,341,062 | 7/1982 | Scudder | 56/330 |
| 4,372,172 | 2/1983 | Gombocz et al. | 198/813 |
| 4,546,602 | 10/1985 | Cosimati | 56/330 |
| 4,580,397 | 4/1986 | Sarig et al. | 56/330 |
| 4,750,322 | 6/1988 | Korthais | 56/330 |
| 4,769,979 | 9/1988 | Mérant | 56/330 |

FOREIGN PATENT DOCUMENTS 2446058 9/1980 France ................................. 56/330

OTHER PUBLICATIONS

"Oscillating Fingers of Blueberry Picker Loosened Ripe Fruit", by L. G. Soderholm, *Design News*, pp. 68 and 69, Undated.

"Over the Row Harvester for Dwarf Fruit Trees", by G. W. Allshouse and C. T. Morrow, Transactions of the ASAE, vol. 15(6), pp. 1038–1043, 1977.

*Primary Examiner*—John Weiss
*Attorney, Agent, or Firm*—Dority & Manning, PA

[57] ABSTRACT

A harvester adapted for harvesting low-lying fruit, such as typical with high-density, dwarf trees, includes an intra-loop conveyor for collecting detached fruit relatively close to the ground and elevating same with a single flighted belt. The harvester straddles a single row of the trees and detaches the fruit therefrom by repeatedly impacting the tree canopies as the harvester moves along the row. Spring-loaded deflection plates close around the tree trunks and deflect detached fruit outwardly to interior surfaces of a pair of single-loop conveyors. Baffles cooperating with the interior of each conveyor restrains fruit therein as the conveyor passes overhead to an inverted position. Fruit is discharged from the conveyor elevated segment onto an output conveyor passing beneath the discharge area. The output conveyor includes a multi-segment, foldable conveyor frame over which a single conveyor belt is entrained. The conveyor belt may be folded over the harvester during non-harvesting transport. Canopy-impacting tines function as fruit detachment devices, and are rotatably driven in a single plane with both constant rotational and oscillatory rotational components of motion. The constant component is synchronized with vehicle forward speed to permit unimpeded feeding of trees through the harvester. The superimposed oscillatory component causes tines to sharply impact tree canopies for detaching fruit therefrom. Both the amplitude and frequency of such impacting action may be varied.

14 Claims, 7 Drawing Sheets

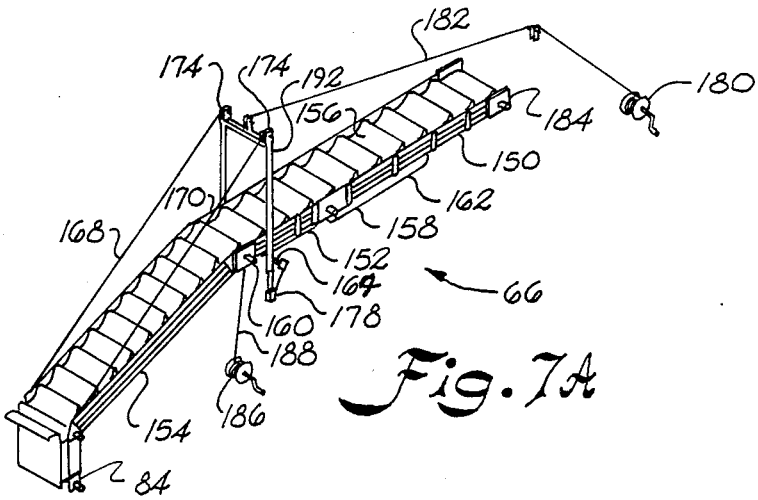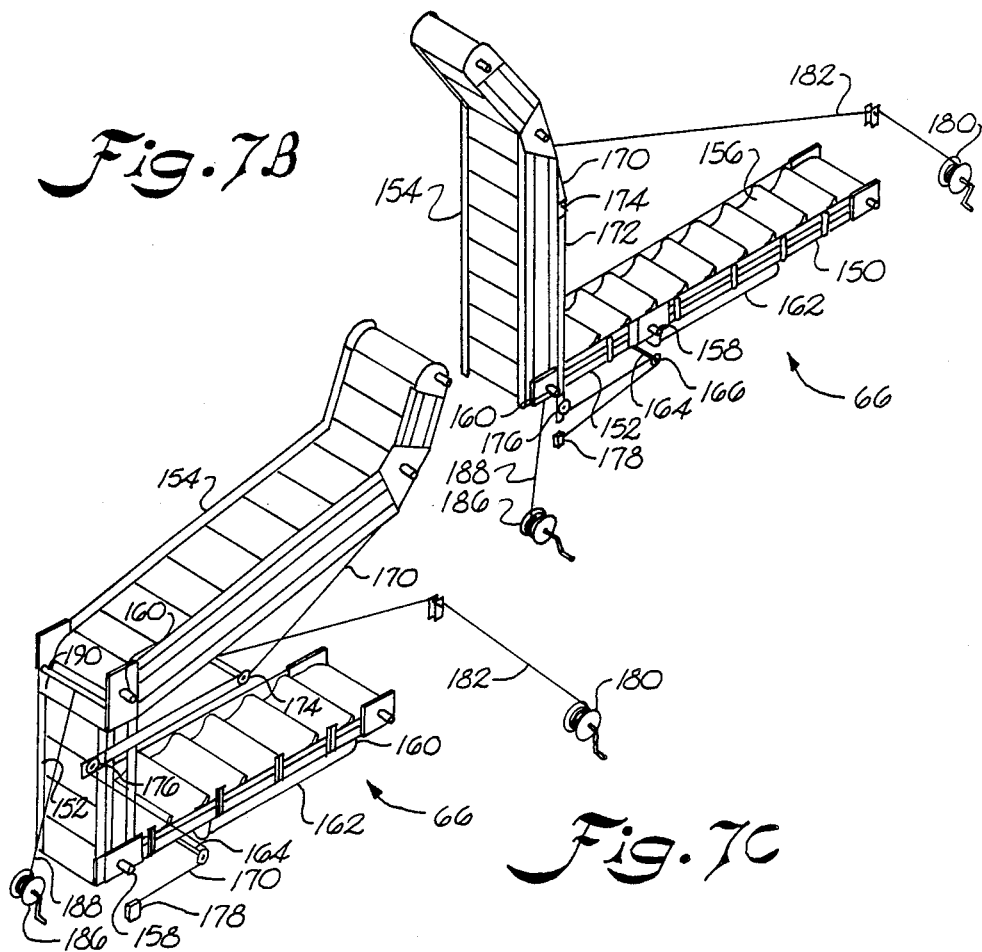

HARVESTING MACHINERY

BACKGROUND OF THE INVENTION

This invention generally concerns improved machinery for fruit harvesting, and particularly for harvesting high-density orchards, including those in which fruit may be relatively close to the ground. Various aspects of the invention also concern an improved intra-loop conveyor for collecting fruit relatively close to the ground and subsequently elevating same for convenient discharge; an improved fruit detachment mechanism having both constant and oscillatory rotational components of motion for detaching fruit from trees; and an improved output conveyor which is adjustable for desired delivery of the output fruit, and foldable for facilitating non-harvesting transport of a machine utilizing such output conveyor.

Improvements in agricultural practices are in modern times often viewed in an economic context. For example, in the area of fruit production, relatively recent efforts have centered on developing fruit bearing trees, shrubs, or the like and/or orchard techniques which provide the planter with faster returns on planting investments. One type of fruit cultural system being developed by plant breeders and horticulturists for high early fruit yields, and hence early returns on the capital invested to establish the orchard, is known as the meadow orchard. Meadow orchards generally include high-density plantings, with typical in-row spacing such as 0.6 meters to 1.0 meters, with adjacent rows spaced 3 meters on-center.

Meadow orchard techniques (including various elements such as selective pruning, and genetic or chemical control) also typically result in short stature or dwarf trees, with average tree heights of approximately 2 meters. Mechanized harvesters have heretofore been generally adapted for harvesting from fruit trees where relatively lower hanging branches or low-lying fruit were not significant. However, studies have shown for various meadow orchard peach tree varieties that 90% of the fruit may be located within a distance of 0.76 meters to 1.07 meters above the soil surface or ground. Hence, prior harvesters are not generally equipped for operating adequately close to the ground to collect the large quantity of low hanging fruit on meadow orchard type trees.

Another aspect of meadow orchard plantings for which prior harvesters are not generally particularly equipped to handle concerns their relatively high-density characteristics. Such characteristics are a part of the economic advantages offered by the meadow orchard cultural system. The characteristics are to an extent reflected in the relatively close on-center spacing of adjacent rows of such fruit trees, and the even closer in-row spacing of such trees.

Another consequence of modern high-density plantings is that a relatively high quantity of fruit must be handled in a relatively concentrated area, but must be gently handled so as to minimize bruises, cuts, or other damage.

SUMMARY OF THE INVENTION

The present invention generally recognizes and addresses various aspects of harvesting fruit from fruit trees in general, and of harvesting from high-density plantings of fruit trees in particular. Accordingly, one of the more general objects of the present invention is to provide improved fruit harvesting machinery in general, and in particular to provide for improved mechanized harvesting of fruit from high-density orchard plantings.

A more particular object of the present invention is to provide a mechanized harvester having a conveyor which can operate relatively close to a ground surface for the collection of large quantities of low-lying fruit after detachment thereof. A further object is to provide such an improved conveyor which collects and advances detached fruit on an inside surface of the conveyor to facilitate passage of the conveyor relatively close to the ground during collection of such detached fruit.

It is another object of this invention to provide an improved conveyor which both effectively collects detached fruit (particularly in an area relatively adjacent the ground) and relatively rapidly elevates such collected fruit to a convenient area for discharge or delivery without interference with the fruit trees from which the fruit have been harvested. It is a more particular object to provide such an improved conveyor which elevates fruit to an area generally above the fruit trees for the aforementioned convenient discharge or delivery of the detached fruit, such as across an adjacent row of fruit trees.

It is another more general object of this invention to minimize damage to harvested fruit, an object which in part may be achieved by minimizing transfer of collected fruit from one conveyor to another as it is collected and discharged.

In providing improved harvesting machinery generally, it is another present object to provide an improved fruit detachment mechanism. A further object is to provide such an improved mechanism which combines constant and oscillatory rotational motion in a single plane for facilitating the unimpeded passage of fruit tree canopies through the fruit detachment mechanism while at the same time also repeatedly impacting such canopies for the removal of fruit from such trees.

In addition to the foregoing objects, it is yet another general object of the present invention to provide an improved output conveyor, which during use may convey fruit from a harvester elevated discharge area to a collection device such as a truck located across an adjacent row of fruit trees, and which conveyor during non-use may be folded across the top of the harvester for convenient transport thereof.

These and other objects are satisfied by various alternate constructions and combinations of mechanisms, devices, structures, and systems disclosed herein. Various combinations of such features and structures may be practiced by those of ordinary skill in the art, to accommodate special needs or requirements of their particular cultural system or other application. Likewise, various modifications to features disclosed herein may be practiced to accommodate particular applications without departing from the more basic aspects of this invention. All such various combinations, as well as combinations including functional equivalents of various structures and features disclosed herein, and modifications thereto, are intended to come within the spirit and scope of the present invention by virtue of present reference thereto.

One exemplary embodiment of an improved mechanized harvester in accordance with the present invention for harvesting fruit from fruit trees, comprises: a mobile support frame adapted for being conveyed over the ground and along a row of fruit trees from which fruit is to be harvested; fruit detachment means, carried on the support frame, for impacting such fruit trees while being conveyed therealong so as to detach fruit therefrom; and conveyor means, comprising a conveyor loop entrained on the support frame over a path passing from a relatively low-lying collection area adjacent the ground to a relatively elevated discharge area thereabove, for collecting detached fruit on the inside of the conveyor loop in such collection area and for elevating such collected fruit to the discharge area, whereby collected fruit may be discharged from the harvester discharge area without interference with the fruit tree from which the fruit is detached.

Other embodiments of such an improved mechanized harvester may include further alternative features of this invention combined therewith. One exemplary such feature may be directed to restraint means, generally cooperative with the conveyor means, for restraining collected fruit on the inside of the conveyor loop until reaching the elevated, discharge area. Another such feature may comprise deflection means carried on the mobile support frame for deflecting fruit detached from fruit trees by the fruit detachment means onto the inside (.e., interior surface) of the conveyor loop generally in the relatively low-lying collection area (or segment) of the path therefor.

Another alternative embodiment constructed in accordance with the present invention is directed to an agricultural machine for mechanized harvesting of fruit from relatively short, high-density fruit trees, such machine comprising: a self-propelled vehicle frame having a longitudinal passageway therethrough, such frame straddling a row of fruit trees from which fruit are to be harvested, with such trees relatively passing through the passageway as the frame is propelled along such row of trees; at least one fruit detachment member, carried on the vehicle frame and projecting at least partially into the passageway, for impacting canopies of fruit trees relatively passing through such passageway as the frame advances along a row of such fruit trees so as to detach fruit therefrom; an assembly of spring-loaded deflection plates, situated in the passageway relatively adjacent the ground, for resiliently closing around the trunks of a row of fruit trees relatively passing through the passageway and for deflecting generally outwardly from such row of trees fruit detached therefrom; a pair of single-loop conveyors carried on the vehicle frame respectively positioned on either side of the assembly of deflection plates, each such conveyor being adapted for advancement in a predetermined direction, and including a horizontal segment passing adjacent to the ground and alongside the deflection plate assembly such that detached fruit deflected thereby is received on the inside surface of such conveyor in the horizontal segment thereof, each conveyor further including an ascending segment following the horizontal segment, an elevated, inverted segment following the ascending segment, and a descending segment following the elevated segment and leading into the horizontal segment, whereby each of the single-loop conveyors comprises an integral, closed loop; conveyor drive means, carried on the vehicle frame, for advancing the conveyors respectively in their predetermined direction; a plurality of conveyor flights, spaced along the inside surface of each conveyor, and curved for engaging and advancing detached fruit therewith as such conveyor is advanced in the predetermined direction thereof; a plurality of restraining baffles, spaced along a portion of each conveyor ascending segment and elevated segment in opposition to flights on the inside surface thereof, for retaining within such flights detached fruit collected therein, such baffles being discontinued in a portion of each inverted, elevated segment comprising a discharge area thereof; output conveyor means passing directly beneath and away from respective discharge areas of the conveyor elevated segments, whereby collected fruit is discharged from the elevated segment into the output conveyor means and carried thereby to a collection device such as a truck moving alongside the machine.

Further aspects of this invention also more particularly concern a detachment mechanism for use with a harvesting machine to be conveyed alongside trees from which fruit are to be harvested, such mechanism comprising: at least one impacting tine supported on an axially rotatable axis; feeder means for axially rotating the tine support axis at a predetermined generally constant speed synchronized with forward speed of the harvesting machine so that canopies of trees from which fruit are to be harvested feed unimpeded passed the at least one tine; and beater means for imparting an oscillation component to the axial rotation of the tine support axis, so that the at least one tine also impacts such tree canopies as they pass by so as to detach fruit therefrom, such detached fruit being otherwise received and collected by the harvesting machine.

Still further embodiments of this invention are more particulary directed to a machine with a multi-segment output conveyor adapted for selectively folding over such machine to improve mobility thereof, such conveyor comprising: a first conveyor frame segment rigidly supported on the machine in a generally horizontal position; a second conveyor frame segment controllably pivotable between generally horizontal and vertical positions, about a first pivot axis situated at a juncture between an outboard end of the first segment and an inboard end of the second segment; a third conveyor frame segment controllably pivotable about a second pivot axis situated at a juncture between an outboard end of the second segment and an inboard end of the third segment; stop means, carried on the second segment, for preventing the third segment from being pivoted relative the second segment beyond about 90°; first pivoting control means for controlling relative pivoting of the third segment about the second pivot axis; and second pivoting control means for controlling relative pivoting of the second segment about the first pivot axis; wherein, the first and second pivoting control means may be selectively operated so that the conveyor is situated in one of an unfolded and a folded position, with such unfolded position being defined by the first and second segments residing in a common, generally horizontal plane and the outboard end of the third segment selectively positioned for desired discharge of the conveyor, and with such folded position being defined by the third segment residing perpendicular to the second segment, with the second segment placed perpendicular with the first segment, so that the first and third segments relatively reside in spaced, horizontal positions with such third segment situated in an inverted horizontal position over the machine on which the first segment is rigidly secured.

These and other objects and aspects of the present invention will be more apparent from the greater detail in the remainder of the present specification.

BRIEF DESCRIPTION OF THE DRAWINGS

A full and enabling disclosure of the present invention, including the best mode thereof, is set forth more particularly below, including reference to the accompanying figures, in which:

FIGS. 7A-7C are illustrations particularly of an exemplary embodiment of output conveyor means in accordance with the present invention, showing unfolded, intermediate, and folded positions therefor.

Figure 1:
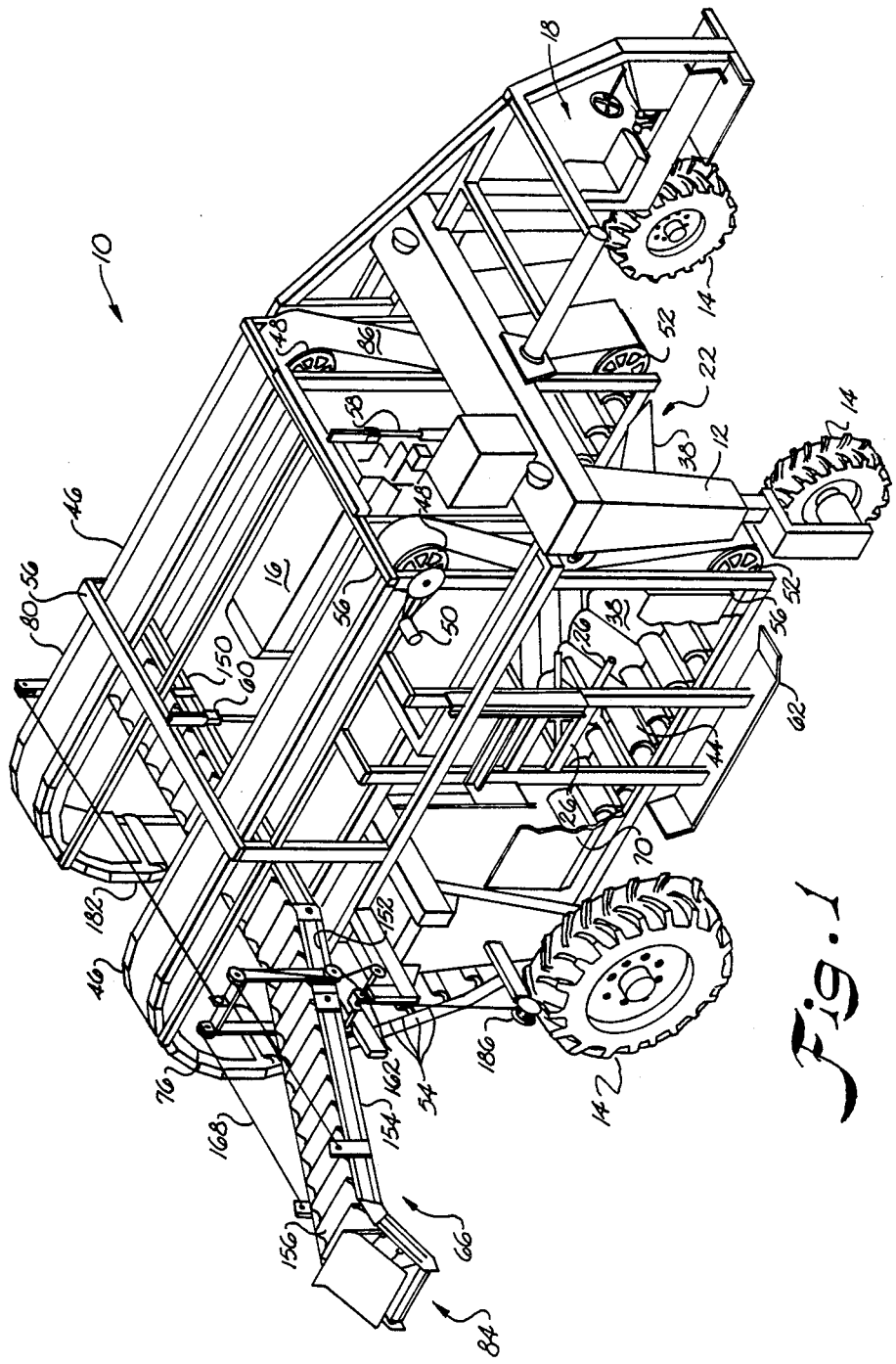
FIG. 1 is a perspective view of an exemplary embodiment of a mechanized harvesting machine incorporating features in accordance with the present invention.

Repeat use of reference characters in the present specification and drawings is intended to represent same or analogous features or elements of the present invention.

DETAILED DESCRIPTION OF THE PREFERRED EMBODIMENTS

Figure 2:
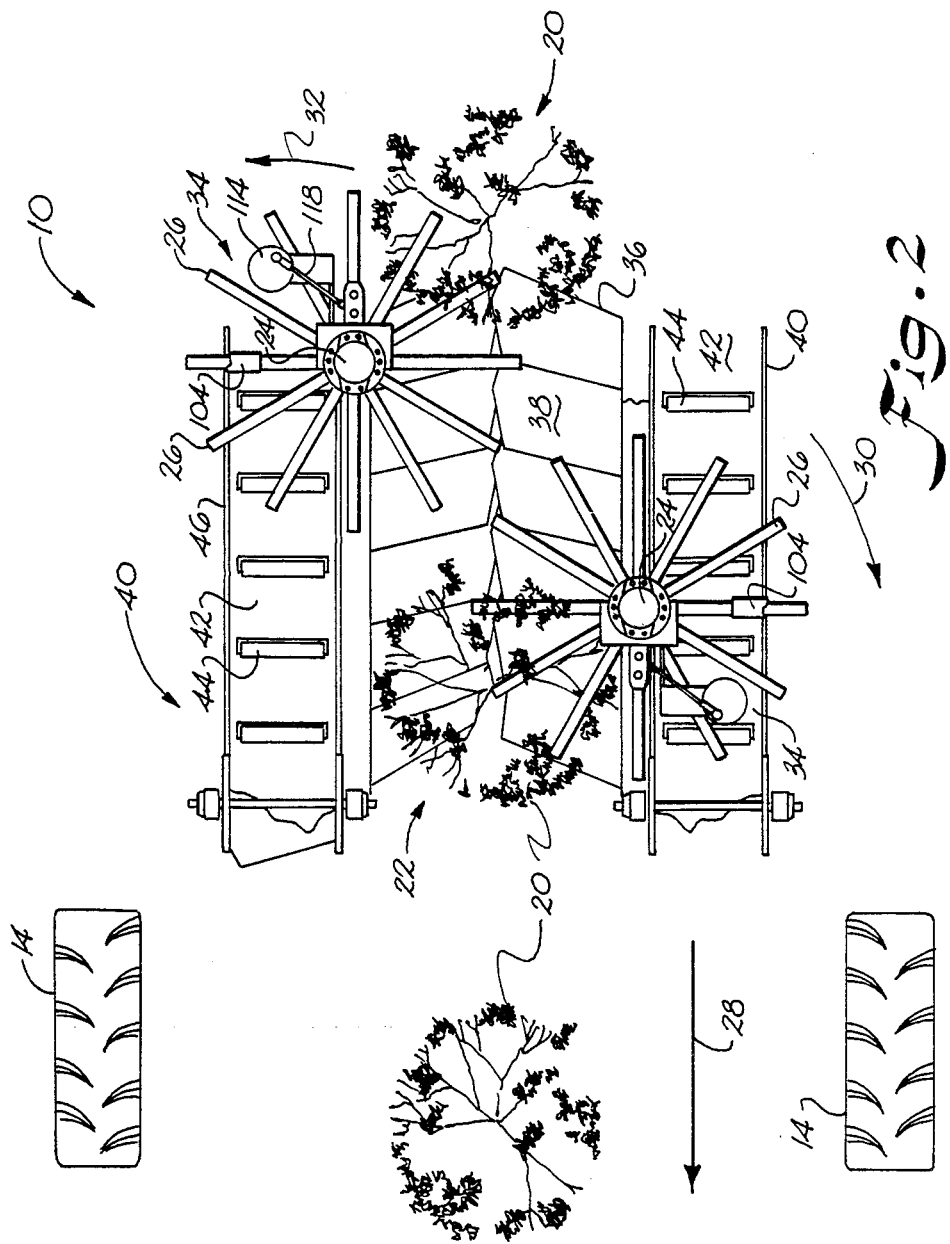
FIG. 2 is a top plan view of certain features of the FIG. 1 embodiment during harvesting of a row of fruit trees, and particularly illustrating fruit detachment means and collecting/elevating conveyor means features, both in accordance with the present invention.
Figure 3:
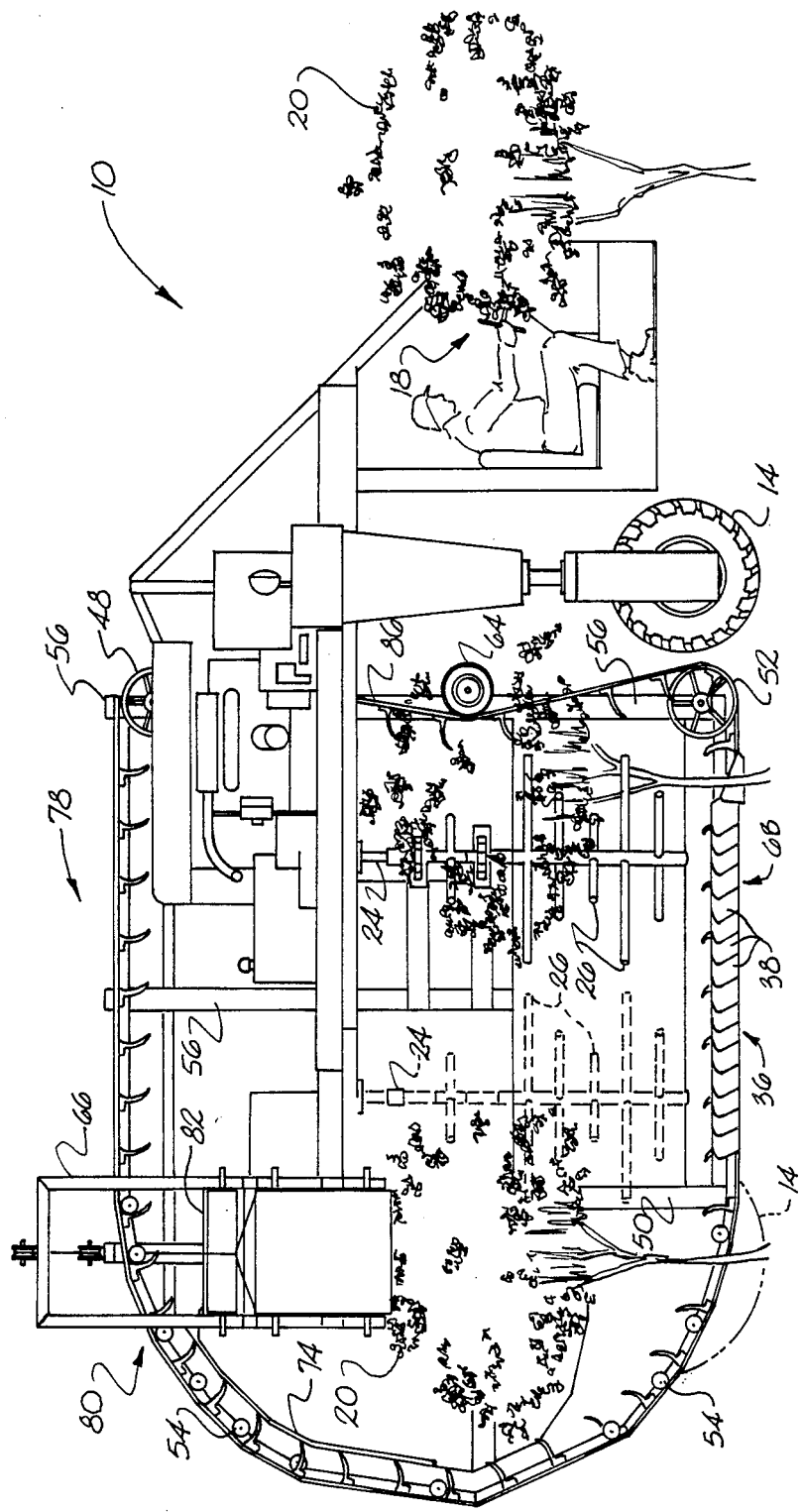
FIG. 3 is a full sectional view of the FIG. 1 exemplary embodiment, taken generally along a longitudinal centerline thereof.

FIGS. 1-3 illustrate perspective, top plan, and longitudinal sectional views of an exemplary harvester embodiment in accordance with the present invention. It is to be understood that such harvester incorporates various features discussed more fully hereinbelow, which features may be separately practiced from one another (in the forms illustrated or in alternative, equivalent forms) or in different combinations incorporated into or used with other harvesting machinery, all of which practices form a part of the present invention.

Referring to FIGS. 1-3, a harvester 10 preferably includes a self-propelled vehicle frame 12, including wheels 14 for mobility and a drive power plant 16, such as an engine and hydrostatic transmission, for advancement of harvester 10. Details of such power plant, and control area 18 therefor, are generally well known and understood by those of ordinary skill in the art without requiring additional disclosure herewith. When an internal combustion engine is utilized for power plant 16, a 40 kilowatt internal combustion, gasoline fueled engine driving a hydrostatic transmission which powers all four wheels is preferred. Such hydrostatic transmission allows the operator to maintain a constant engine rpm while precisely controlling the forward speed, with the direction of the frame steered by turnable front wheels. Of course, the present invention may be practiced with a support frame which is pulled or pushed, or otherwise comprises a non-self-propelled embodiment, or alternatively frame 12 may be advanced on tracks, legs, or sleds instead of wheels 14.

Vehicle frame 12 may be outfitted with various operative components in accordance with the present invention, such as for detaching, collecting, and conveying fruit as trees 20 pass through a longitudinal passageway 22 defined by vehicle frame 12. Preferably, harvester 10 is steered by an operator, or some other automatic means, so that a row of fruit trees 20 bearing fruit to be harvested is relatively passed through passageway 22 generally along a centerline thereof, and with the vehicle frame straddled over such row (see FIG. 2). Passageway 22, in the presently illustrated exemplary embodiment, includes fruit detachment means 24 projecting at least partially into such passageway, supported on vehicle frame 12 generally above trees 20, for detaching fruit from such trees as part of the harvesting operations.

As discussed more particularly below, with reference to present FIGS. 5 and 6, fruit detachment means 24 include tines 26 which are rotatably driven for repeatedly impacting the canopies of fruit trees passed therealong, as represented by present FIG. 2. In general, harvester 10 moves at a constant speed in a defined forward direction represented by arrow 28 (see FIG. 2). The row of fruit trees 20 relatively pass through passageway 22, while the tines 26 of the respective fruit detachment means 24 are rotated generally in the direction of respective arrows 30 and 32 so that trees 20 feed unimpeded through the harvester (i.e., without jamming, hanging up, or uprooting trees). While so feeding due to a constant rotational component of motion for fruit detachment means 24, beater means 34 are also operated to provide a tree canopy impacting action, or oscillatory component of rotation, in the same plane as the above-mentioned constant rotational component of motion, as explained further hereinbelow.

Vehicle frame 12 also carries relatively close to the ground and within passageway 22 thereof deflection means 36, generally for deflecting detached fruit onto the interior surface of collecting/elevating conveyor means provided in accordance with the present invention, discussed more particularly below. Such deflection means may comprise a variety of functionally-equivalent structures carried on the vehicle frame relatively adjacent the ground over which frame 12 moves, but preferably includes an assembly of spring-loaded deflection plates 38 as illustrated in FIGS. 1-3. The plates are resiliently mounted on frame 12 (i.e., supported thereon with spring-loaded hinges, not shown) for closing around the trunks of fruit trees 20 as such trees relatively pass through passageway 22. Present FIG. 2 illustrates such rearward pivoting (i.e., opposite to the direction of arrow 28) and resilient, forward response as plates 38 pivot slightly rearward for passing around the trunks of trees 20, with minimum gapping therebetween. Also, the free tips of plates 38 slightly overlap along the centerline of passage 22 to further minimize gaps through which deflected fruit might fall, and are slightly elevated with respect to the pivoting bases thereof (as represented by present FIG. 3) for deflecting detached fruit outwardly from the centerline of passageway 22 towards conveyor means 40 provided in accordance with the present invention. Preferably two sets of plates 38 are provided on either side of the centerline of passageway 22 for deflecting fruit to collecting/elevating conveyor means 40 also provided in respective pairs and situated on respective centerline sides.

In the presently preferred harvester embodiment, a pair of such conveyor means 40 are illustrated on each respective side of passageway 22, and each include a single, integral conveyor belt 42 with a plurality of flights 44 supported on an interior or inside surface thereof. Details of conveyor means 40 are discussed further below with reference to present FIGS. 4 and 5, but present FIGS. 1 and 3 provide a general overview of the collecting/elevating conveyor means feature in accordance with the present invention. With reference to such figures, it should be noted that the respective pair of conveyor means on either side of passageway 22 are preferably the same; hence, only one of such conveyor means needs to be discussed in detail for a full understanding of this feature of the illustrated preferred embodiment.

Conveyor means 40 preferably comprises a single-loop conveyor 46 entrained about a predetermined path over vehicle frame 12. More particularly, conveyor loop 46 is entrained about drive sheaves 48 (having conveyor drive means therefor 50), large diameter idler sheaves 52, and small diameter idler sheaves 54. All such sheaves are supported on a conveyor frame subassembly 56 carried on vehicle frame 12. Such subassembly may be adjustably positioned on vehicle frame 12 with lift cylinders 58 and 60 so that the height of conveyor loop 46 relative the ground may be adjusted. Such adjustment may be desired for operational purposes, such as clearing irritation systems, or slightly hilly or rooted terrain, or may be used to completely lift the conveyor means clear of the ground for non-harvesting transport of harvester 10. A skid plate 62 may be rigidly secured to frame sub-assembly 56 for projecting slightly beneath the lowest area of conveyor means 40 to ensure that the bottom of such conveyor means does not engage the ground over which harvester 10 is conveyed. In other words, contact by skid plate 62 with the ground rides sub-assembly 56 upward to prevent contact by conveyor means 40 with the ground.

The radii of sheaves 48 and 52 are also selected to permit passage of flights 44 (approximately 15 cm. in height) thereby. The smaller diameter idler sheaves 54 are provided on each longitudinal edge of conveyor loop 46 so as to permit passage of such flights.

Tightening means 64 (see FIG. 3) may be provided for contributing to positive tracking of conveyor loop 46 about the above-mentioned sheaves, all of which sheaves are located on the interior of the single-loop conveyor. Tightening means 64 may comprise various constructions, such as an inflatable pneumatic tire which may be rotatably mounted on frame 12 adjacent the conveyor loop outside, and inflated and/or mounted so as to tighten such loop, as illustrated by present FIG. 3.

In general, conveyor means 40 advantageously collects detached, deflected fruit from a collection area relatively adjacent the ground over which harvester 10 is conveyed, and with such single-loop conveyor belts 42 (with reference to only one conveyor means) elevates such collected fruit to a convenient discharge area preferably above the fruit trees themselves. Thus, a relatively compact construction permits collection of even low-lying fruit (such as typically found in meadow orchard cultural systems) and efficient elevation of such collected fruit to a position near the top of the machine for convenient discharge therefrom to an output conveyor means 66 (discussed in detail below) in accordance with the present invention.

Continuing with an overview of the collecting/elevating conveyor means 40 in accordance with the present invention, FIG. 3 illustrates a generally horizontal collection segment 68 situated relatively close to the ground for collecting deflected, detached fruit. The height of such collection segment of the predetermined path of conveyor loop 46 is generally determined by operation of lift cylinders 58 and 60, as referenced above. In general, the lower limitation of the height of collection segment 68 above the ground is defined by the vertical distance between the bottom of skid plate 62 to the top of the inside surfaces of conveyor loop 46. Such distance is preferably about 14 cm., though alternative embodiments could be provided for even lower heights Lift cylinders 58 and 60 preferably have an operational range of 40 cm. for selectively positioning the vertical height of frame sub-assembly 56 relative vehicle frame 12 over such 40 cm range.

From collection segment 68, the direction of advancement along the predetermined path of conveyor loop 46 (which conveyor loop is advanced in such predetermined direction by the rotation of conveyor drive means 50) is generally in a rearward direction. Flights 44 are slightly curved (rearwardly) and extend perpendicularly across conveyor belt 30 at approximately 30 cm intervals for engaging and advancing collected fruit along with the advancing conveyor belt. Shields 70 (shown in partial cut-away in FIG. 1) are positioned on a side of each conveyor loop opposite deflection plates 38 for ensuring that deflected fruit is received on the inside surface of conveyor loop 46 in the collection region of its predetermined path.

As conveyor loop 46 is advanced rearwardly, the generally horizontal, collection region gives way to an ascending segment 72, generally including a steep, irregular vertical curve at the rear of vehicle frame 12 for efficient and rapid elevation of collected fruit. As illustrated in FIG. 3, flights 44 are generally in a vertical position in collection segment 68, but begin tilting and are eventually inverted as conveyor loop 46 advances along its predetermined path. To prevent collected fruit from falling away from the inside surface of conveyor loop 46 and the flights 44 thereon, restraining means 74 comprising sheet metal baffles 76 are provided along a portion of the ascending segment 72 and an overhead elevated segment 78 to hold fruit onto the inside surface. Such baffle plates 76 are discontinued as the elevated, inverted segment 78 of the conveyor loop path enters a discharge area 80.

In discharge area 80, collected fruit is permitted to free-fall into output conveyor means 66, a short distance onto output conveyor belt 82 thereof, by which the discharged fruit is conveyed away from the discharge area to a desired delivery point (see FIG. 1). The outboard end 84 of output conveyor means 66 may be selectively positioned for establishing such desired delivery, as discussed further hereinbelow. Also, the entire output conveyor means 66 may be folded back over the top of vehicle frame 12 for convenient transport of harvester 10 over public roadways, as further illustrated and discussed with reference to FIG. 7A-7C below.

The predetermined path of conveyor loop 46 continues from elevated segment 78 thereof through a return, descending segment 86, generally located forwardly on vehicle frame 12, for completing return of the predetermined path of integral belt 42 to the horizontal collection segment 68 thereof. Because conveyor loop 46 returns above the inside fruit-carrying surface thereof (instead of below such surface), conveyor means 40 of the present invention permits the conveyor loop thereof to operate closer to the ground surface to collect low-hanging fruit, such as characterized by meadow orchard trees, and other short stature or dwarf trees. Also, the fruit is sufficiently elevated by the single-loop conveyor to a discharge area which is situated above trees 20 for convenient discharge of fruit without interference with such trees. In meadow orchards, trees 20 are typically only about two meters high, so that discharge area 80 is correspondingly preferably about 2.5 meters above the ground.

The foregoing provides a general overview of a harvester 10 in accordance with the present invention, including various particular aspects thereof. The following description of FIGS. 4–7C provides greater details for various of the foregoing features, especially fruit detachment means 24, collecting/ elevating conveyor means 40, and folding output conveyor means 66.

Figure 4:
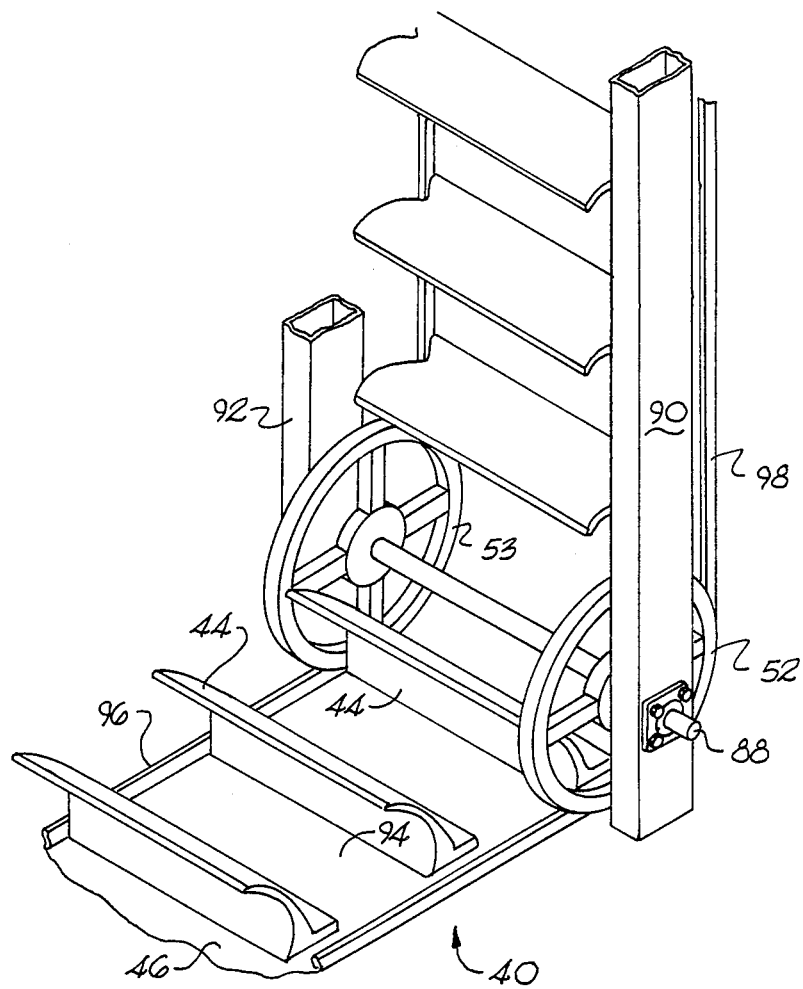
FIG. 4 is a partial, enlarged perspective view of collecting/elevating conveyor means features in accordance with the present invention.
Figure 5:
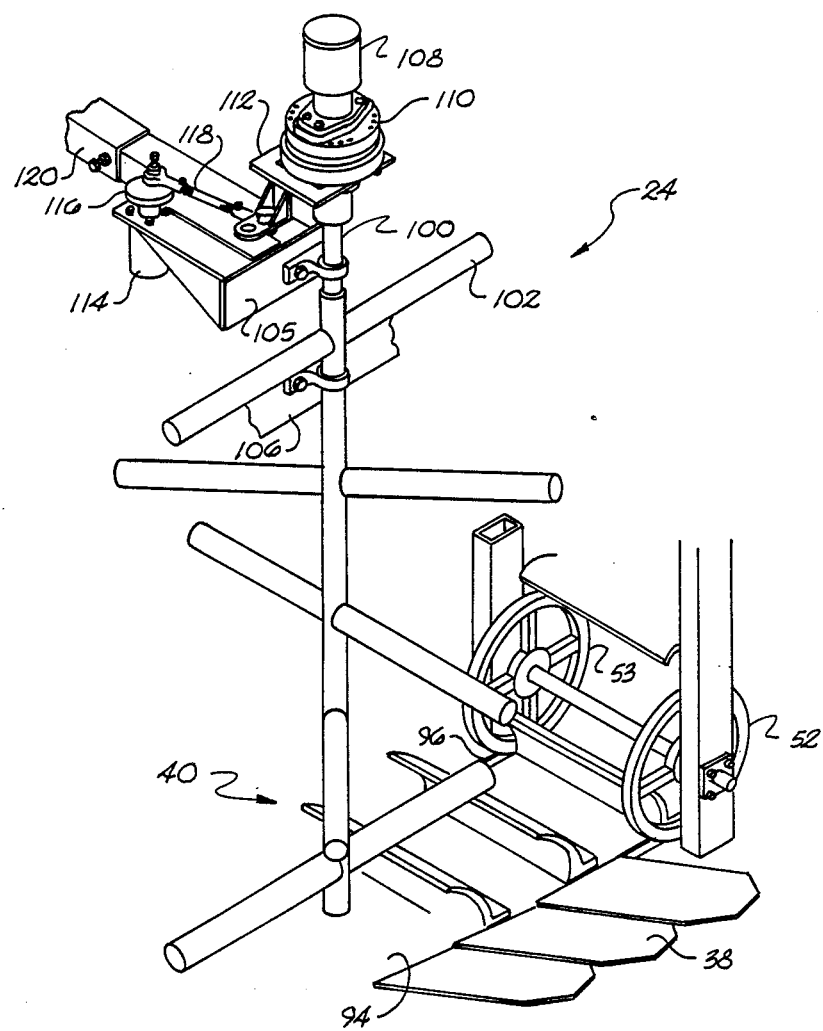
FIG. 5 is a partial, enlarged perspective view similar to that of present FIG. 4, and further illustrating therein fruit detachment means and deflection means features, both in accordance with the present invention.

Referring to FIGS. 4 and 5, further details of collecting/elevating conveyor means 40 are represented. Large diameter idler sheaves 52 and 53 are supported about a rotatable shaft 88 supported on a pair of vertical arms 90 and 92 of conveyor frame sub-assembly 56. As mentioned above, flights 44 are received at spaced integrals on an inside surface 94 of conveyor loop 46. Preferably on each lateral side of flights 44, adjacent respective edges of conveyor loop 46, V-belts 96 and 98 are bonded to inside surface 94. Such V-belts are received in corresponding V-shaped outside diameters of idler sheaves 52 and 53, and sheaves 48 and 54 mentioned above, for support of conveyor loop 46 and for providing positive drive traction thereto from conveyor drive means 50.

With conveyor loop 46 entrained about the outside diameters of its drive and idler sheaves with such sheaves received on the inside of the conveyor loop, the collection segment 68 of the predetermined path of collecting/elevating conveyor means 40 may be advantageously positioned relatively close to the ground. The presently disclosed exemplary conveyor support and drive construction for conveyor means 40 also ensures effective and efficient collection and elevation of fruit, even though the collective weight of the conveyor belt assembly and fruit collected thereon is not inconsequential. However, the V-belt drive features, including relatively large contact surfaces between the large diameter drive and idler sheaves and the V-belts 96 and 98, enable the desired drive tracking of conveyor loop 46.

FIG. 5 more fully illustrates the relationship of conveyor means 40 with deflection plates 38 and fruit detachment means 24. In particular, FIG. 5 illustrates that deflection plates 38 are angled downwardly towards the inside surface 94 of conveyor loop 46 for deflecting fruit towards such surface. Plates 38 also have a rearward sweep of about 15% to facilitate their resilient engagement of the trunks as described above. Fruit falls on deflection plates 38, and to some extent directly onto surface 94, after being detached from fruit trees by fruit detachment means 24.

As more fully illustrated in FIGS. 2 and 3, fruit detachment means 24 preferably includes at least a pair of mechanisms longitudinally staggered within passageway 22 of harvester 10, and provided on generally opposite sides of a row of fruit trees passing through such passageway (see FIG. 2) for more fully impacting such fruit trees from which fruit are to be harvested. Staggering of plural fruit detachment means 24 is represented in FIG. 3 by dotted-line illustration of one of such means (indicating that it is foreground as to the sectional view of such figure). Of course, a single mechanism may be used instead of such two or more mechanisms, particularly since results indicate that a substantial percentage of detachable fruit, for example up to about 85%, may be removed from a given fruit tree with a single such mechanism (as illustrated in present FIG. 5).

Referring more particularly to such FIG. 5, an axially rotatable axis or tine support member 100 is illustrated in a generally vertical orientation. Such orientation is primarily intended for use with trees which are pruned or otherwise grown so as to have relatively flat profiles, for efficient engagement thereof by such vertically disposed member. However, other, non-vertical positions may be used with trees which are otherwise pruned, such as on an angle, for maximizing contact between such trees and the fruit detachment mechanism in accordance with this invention.

Tine support member 100 includes at least one tine 102, and preferably a plurality of such tines, extending outwardly therefrom. Such tines are provided with foam padding 104 (see FIG. 2) or similar treatments to minimize damage to trees which are impacted thereby. The tines are generally perpendicular to support member 100, but may be otherwise supported thereon. Regardless of specific construction, the tines are rotated about tine support member 100 due to axial rotation thereof, and are primarily intended to impact main structural branches of trees along which they are passed. In such manner, fruit is efficiently detached from such trees, with minimal damage to both the trees and the fruit.

As represented by the two relatively fixed mounts 105 and 106, tine support member 100 preferably rotates in a fixed plane. Mounts 105 and 106 may be variously supported on vehicle frame 12, but preferably are mounted on conveyor frame sub-assembly 56 for movement therewith, so as to avoid interference between fruit detachment means 24 and conveyor means 40 during vertical movement thereof by operation of cylinders 58 and 60.

Axial rotation of member 100 (in the plane of arrows 30 and 32 of present FIG. 2) includes two separately driven components. The first component comprises a constant rotational component, as mentioned above, for feeding trees 20 unimpeded through passageway 22. Such constant axial rotational motion is provided by a hydraulic drive motor 108 preferably interconnected with member 100 through a relatively massive reduction gear box 110. Such relatively massive reduction gear box prevents any feedback (due to the canopy impacting action of tines 102) through a hydraulic drive system for hydraulic drive motor 108. Of course, alternative types of drive motors, such as an electrical drive motor, may be used in place of the preferred hydraulic drive motor 108. Gear box 110 is supported on a mounting plate 112 defining a torque arm therefor.

In addition to the constant rotational component of motion of member 100, an oscillatory component of rotational motion is superimposed on member 100 in the same rotational plane. Such oscillatory component causes tines 102 to impact or beat branches forming the canopies of trees 20 for detaching fruit therefrom. Such beater means for selectively superimposing an oscillatory component onto the constant rotational motion described above preferably includes an impact drive motor 114 for rotatably driving a crank arm 116 mounted thereon. Crank arm 116 is in turn interconnected with mounting plate torque arm 112 via a connecting rod 118.

Rotation of impact drive motor 114 causes torque arm 112 to be oscillated about a null position thereof, which in turn superimposes the aforementioned oscillatory component of rotational motion on member 100. The amplitude and frequency of such oscillatory component may be varied as desired for satisfactory detachment operations with given trees, shrubs, or the like. The oscillation frequency is variable by adjusting the rotational speed of impact motor 114, and is preferably in a range between about 0 to about 200 cycles per minute. An adjustable support member 120 may be selectively positioned, together with the selected length of connection arm 118, and the selected torque arm length of mounting plate 112, for determining the amplitude of oscillatory motion, which is preferably about plus or minus 25° on either side of the aforementioned null position of mounting plate 112. Changes in the physical relationship of the aforementioned elements, such as the length of connecting arm 118, or the length of the torque arm of mounting plate 112, obviously adjusts the amplitude of such oscillation.

The constant rotational component of motion for member 100 is preferably synchronized with the forward motion (and, alternatively the reverse motion as well) of harvester 10 with which fruit detachment means 24 is associated. Such constant rotational speed causes trees 20 to move unimpeded through passageway 22 as the tines of a pair of such means 24 are rotated in a predetermined direction (see arrows 30 and 32 of present FIG. 2). In general, only operation of the above-described beater means results in impaction of the tree canopies. In other words, if impacted drive motor 114 were switched off, trees 20 would pass through passageway 22 of harvester 10 with very little fruit detachment since the speed of motor 108 and the rotational speed of member 100 is preferably synchronized with harvester motion.

Figure 6:
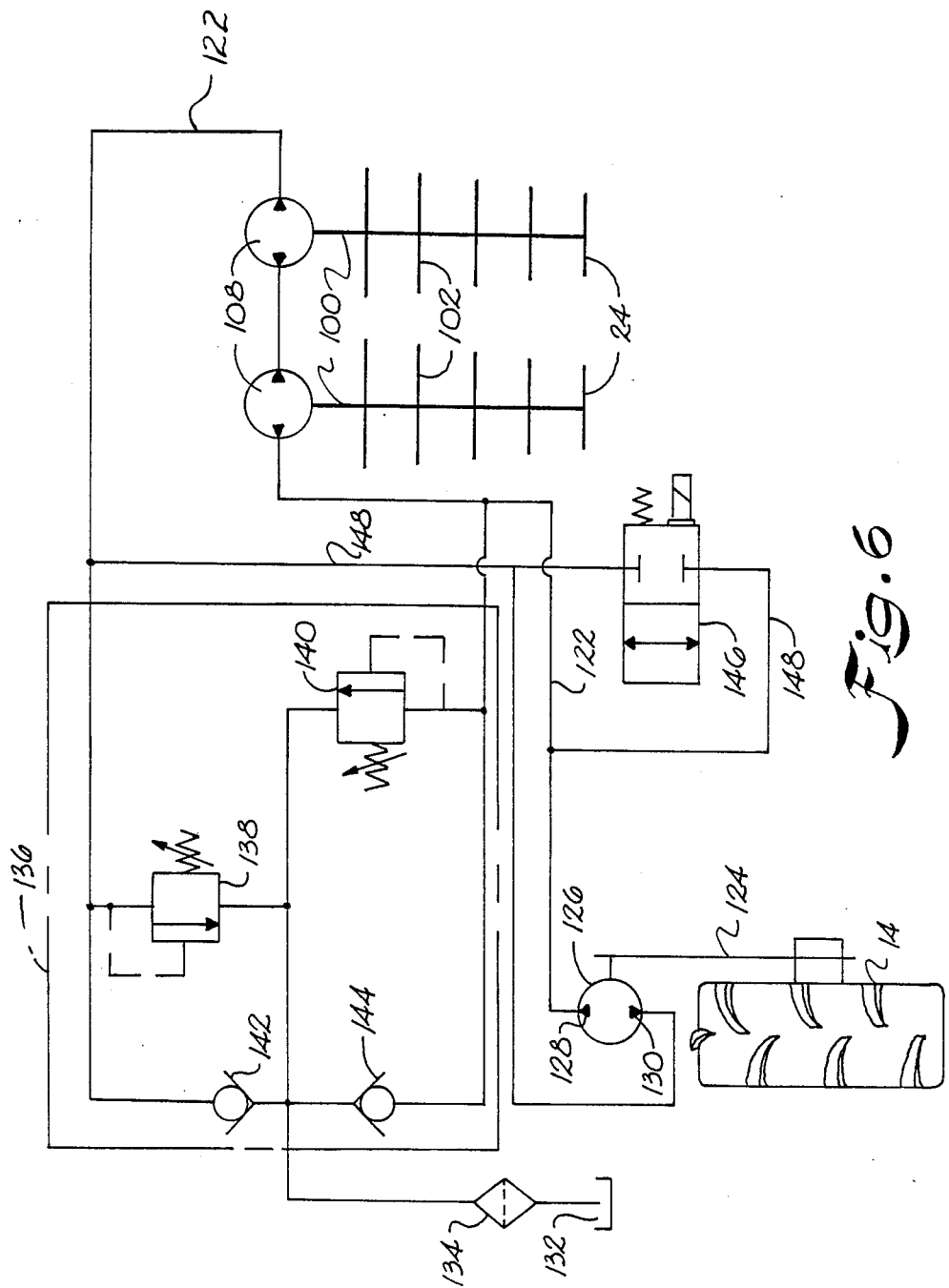
FIG. 6 is a block diagram of a hydraulic drive circuit or system for use with the present fruit detachment means.

FIG. 6 more fully illustrates an exemplary hydraulic drive system for automatically synchronizing the constant rotational speed of fruit detachment means 24 with the forward (and reverse) movement of harvester 10.

Referring now to FIG. 6, a schematic representation is made of a pair of axially rotatable tine support members 100 with tines 102 supported thereon. Hydraulic drive motors 108 are schematically represented at the top of each such axis 100. Reduction gear boxes are omitted in the FIG. 6 schematic representation, for more clearly illustrating only the hydraulic drive circuit for such motors. The pair of motors 108 are preferably about the same capacity, and are interconnected in series with a hydraulic drive line 122, in which hydraulic drive fluid flows as described below.

While various alternative methods of detecting harvester movement may be practiced, in the present exemplary embodiment, a chain drive 124 is associated with a support wheel 14 of harvester 10 for being rotatably driven in synchronization with movement of such harvester 10 (in either direction thereof). Hydraulic member 126 is generally identical to the structure of hydraulic motors 108, but is operated in a driven pump mode, i.e., hydraulic fluid is driven in either of the direction of arrows 128 or 130 depending on the movement of drive train 124, which is in turn dependent on the rotational movement of harvester wheel 14. Because of the connection to motors 108 through line 122, such motors will thus be driven in synchronization (as to speed and direction) relative harvester 10 for automatic unimpeded movement of trees therethrough regardless of forward or reverse harvester movement.

A reservoir 132 is schematically illustrated together with a filter 134 for providing the necessary reservoir of hydraulic fluid for the system illustrated in FIG. 6, as understood by those of ordinary skill in the art. As further known to those of ordinary skill in the art, a dual check relief valve system 136 may be provided in association with hydraulic loop 122, to protect the hydraulic circuit by controlling the amount of force exerted at motors 108, in either drive direction thereof. In other words, check valves 138 and 140 may operate together with relief valves 142 and 144 for protecting the hydraulic drive circuit of FIG. 6 from overloading in either operational direction of motors 108, and for accommodating the expansion and contraction of hydraulic fluids within loop 122 relative reservoir 132, as understood by those of ordinary skill in the art without further, detailed explanation. By selectively controlling the amount of force exerted by motors 108, tines 102 may for example be prevented from uprooting trees 20 which they contact during harvesting should trees become jammed within the harvester.

Various additional features may be provided for use with such exemplary hydraulic drive circuit as understood by those of ordinary skill in the art. For example, a two-way, two-position normally-closed directional control valve 146 may be solenoid operated to serve as a by-pass valve to permit movement of harvester 10 without operation of motors 108. In other words, normally hydraulic fluid flows within hydraulic line 122, driven in the corresponding direction of rotation for the input to hydraulic pump 126, as discussed above. Should harvester 10 be moved during non-harvesting use thereof, such as for example with cylinders 58 and 60 operated for lifting conveyor means 40 and skid plate 62 well clear from the ground, by-pass valve 146 may be operated to permit fluid to flow through by-pass hydraulic line 148, instead of through motors 108. Thus, the automatically synchronized operation of motors 108 can be selectively disassociated with forward or reverse movement of harvester 10, for movement thereof during non-harvesting. Alternative mechanisms, such as clutch arrangements or the like, may be practiced instead of directional control valve 146.

Referring now to FIG. 7A-7C, as well as prior discussed FIGS. 1 and 3, further details of folding output conveyor means 66 in accordance with the present invention are provided.

FIGS. 7A and 1 illustrate generally an unfolded position of output conveyor means 66, with outboard end 84 thereof selectively positioned for delivery of discharged fruit. In general, output conveyor means 66 comprises a multi-segment output conveyor adapted for selectively folding over harvester 10 to improve mobility of such harvester whenever it is necessary to transport same over public roadways, such as underneath road by-passes, or the like. Present FIG. 7C illustrates a defined folded position of output conveyor means 66, with FIG. 7B illustrating an intermediate position between the above-mentioned folded and unfolded positions.

While various alternative constructions may be practiced in accordance with the present invention, output conveyor means 66 preferably includes three separate conveyor frame segments 150, 152, and 154, having a single conveyor belt 156 entrained thereabout to minimize damage to fruit advanced with such conveyor. More particular structural details of conveyor means 66 is as follows. First segment 150 is rigidly secured to vehicle frame 12, as illustrated in application FIGS. 1 and 3. The outboard end of first segment 150 pivotably supports an inboard end of second segment 152 about a first pivot axis 158. An outboard end of second segment 152 is in turn pivotably associated with an inboard end of third segment 154 with a second pivot axis 160. In a harvesting, or unfolded position, second segment 152 is preferably aligned in a common, horizontal plane with first segment 150 (see FIGS. 7A and 1). In such position, outboard end 84 of third segment 154 is selectively raised or lowered, as described below, to adjust the output of conveyor 156 to a suitable height to deliver fruit thereon into a bulk container.

As illustrated in FIG. 1, first segment 150 passes directly beneath discharge areas 80 of collecting/elevating conveyor means 40 for receiving fruit discharged therefrom. In other words, conveyor means 66 passes directly beneath the elevated, inverted segment 78 of conveyor loop 46 (see FIGS. 1 and 3) for receiving collected fruit discharged therefrom. Output conveyor means 66 then advances such discharged fruit and delivers same, preferably across an adjacent row of fruit trees, into a common collection device such as a truck or similar apparatus moving parallel to the path of harvester 10.

A hydraulic cylinder 162 is associated with output conveyor means 66, preferably beneath first segment 150 thereof, for controlling the pivotable position of third segment 154 relative second segment 152. An actuatable end of cylinder 162 is connected to a member 164 having a pair of pulleys 166 (only one illustrated) supported on either end thereof. The ends of a pair of height-adjustment cables 168 and 170 are attached on either side of third segment 154 relatively adjacent the outboard end 84 thereof. Stop means 172 are generally fixedly supported relative second segment 152, for preventing pivoting of third segment 154 relative such second segment more than about 90° (or some other desired angle). Cables 168 and 170 are entrained over pulleys 174 located at the upper free end of such stop means 172 and continue downward therefrom to be entrained about pulleys 176 located on the fixed, other end of such stop means 172 (only one such pulley 176 is illustrated). Thereafter, cables 168 and 170 are routed from their respective pulleys 176 to their respective pulleys 166, and thereafter to a fixed position 178 supported on vehicle frame 12.

Thus, cables 168 and 170 comprise a fixed length, and extend between respective ends supported near the outboard end 84 of third segment 154 and fixed support 178 on the harvester frame, routing therebetween over pulleys 174, 176, and 166. Hydraulic cylinder 162 and selected operation thereof constitutes a first pivoting control means for controlling relative pivoting of third segment 154 about said second pivoting axis 160.

A comparison of FIGS. 1 and 7A illustrates various positions which may be assumed by outboard end 84 of output conveyor means 66 with selected operation of cylinder 162. Present FIG. 7B illustrates an intermediate position of output conveyor means 66, in which hydraulic cylinder 162 is fully retracted so that third segment 154 is brought into contact with stop means 172 (i.e., raised vertically to a position approximately perpendicular to the plane of second segment 152), but segment 152 still resides in a common plane with segment 150. Second pivoting control means separately controls relative pivoting of such second segment 152 and first segment 150. In particular, such second pivoting control means includes a first winch means 180 interconnected via cable 182 thereof with a free end of stop means 172 and a support point on harvester 10 generally adjacent the inboard end 184 of first segment 150. Such second pivoting control means further includes a second winch means 186 and a cable 188 thereof between a fixed position on vehicle frame 12 (see FIG. 1) and an underside member 190 of second segment 152.

Alternate withdrawing and extension of cables 182 and 188 of respective winch means 180 and 186 permits second segment 152 to be controllably pivoted about first pivot axis 158. Both winch means 180 and 186 are preferably equipped with braking capability, so as to maintain control of second and third segments 152 and 154 during alternate folding and unfolding (i.e., extension) of output conveyor means 66 because the center of gravity of the combined segments 152 and 154 passes over their pivot axis.

In the fully folded position illustrated in present FIG. 7C, the first and second segments, and the second and third segments are generally mutually perpendicular, so that the first and third segments reside in spaced horizontal positions with the third segment 154 situated in an inverted generally horizontal position over harvester 12. In such folded position, output conveyor means 66 is positioned for road travel of harvester 10.

The foregoing constitutes a fairly specific description of the structure and operation of various features and constructions provided in accordance with the present invention. More particular details thereof may be selected and practiced by those of ordinary skill in the art, especially when applying the broader teachings of the present invention to a particular application. For example, the number, relative positioning, and length of fruit detachment mechanisms may be varied. For example, in some fruit cultural systems, the fruit trees may be pruned so as to define a generally Y-shaped the canopy when viewed along the end of a row of such trees. In correspondence therewith, the rotational plane of the fruit detachment mechanism may be angled to efficiently impact such Y-shaped tree canopies. Similar adjustments may be made for other canopy shapes, whether now existing or hereafter achieved.

Other alternative constructions varying other particular features of the invention from those illustrated may be practiced. For example, a harvester may be provided in accordance with the present invention, particularly adapted for use with generally taller trees. In such case, a plurality of single-loop conveyors may be used for collecting/elevating conveyors as presently illustrated, but in stacked arrangements so that fruit from a given vertical segment of the tree need only fall a limited distance into a collecting conveyor. The trees in such a cultural system may be correspondingly pruned to provide tree canopies having two (or more) distinct vertical segments.

Likewise, alternative predetermined paths from that presently illustrated may be used with given conveyor means 40 in accordance with the present invention. Also, a machine with a single fruit detachment mechanism and single conveyor means 40 (instead of the respective pairs illustrated) may be used for making multiple passes along either side of a row of fruit trees to be harvested.

Further alternatives may be practiced by those of ordinary skill in the art without departing from the spirit and scope of the invention. For example, where two or more fruit detachment mechanisms are utilized, the oscillatory frequency (and or amplitude) of relatively downstream fruit detachment mechanisms may be increased relative the upstream fruit detachment mechanism for improved overall fruit detachment with minimized damage to the collective fruit. For example, the dotted line (downstream) mechanism 24 of FIG. 3 may have a 10% higher oscillatory frequency than the solid line (upstream) mechanism 24 of such figure.

Likewise, the width of passageway 22 may be varied to accommodate different tree canopy sizes. In one exemplary embodiment, pivoting deflection plates 38 may have a length of about 18 inches, and a rearward rest angle of about 15°, with a slight vertical elevation for deflection of fruit. Other dimensional characteristics may also be selected by those of ordinary skill in the art for practicing various embodiments of this invention. For example, where conveyor flights 44 are provided about 15 cm in height, the drive sheaves and large diameter idler sheaves may be provided at least about 32 cm in diameter to allow the flights to pass under their respective shafts without interference. The belting material used for the collecting/elevating conveyor belts 42 may likewise be selected for adequate stiffness in the cross-belt direction. For example, with a width of 42 cm and a thickness of about 1.2 cm, a tensil rating of 385 N/cm is adequate to prevent belt sagging between supporting sheaves.

Various further modifications and variations to the presently disclosed features and aspects of this invention, including substitution of functional equivalents for structures and means disclosed herewith, may be practiced by those of ordinary skill in the art. Furthermore, while the foregoing description has been specifically directed to preferred embodiments of the present invention, all such language is intended as words of description only, and not words of limitation, with the present invention being further described in the appended claims.

What is claimed is:

1. A mechanized harvester for harvesting fruit from fruit trees, comprising:
   a mobile support frame adapted for being conveyed over the ground and along a row of fruit trees from which fruit is to be harvested;
   fruit detachment means, carried on said support frame, for impacting such fruit trees while being conveyed therealong so as to detach fruit therefrom; and
   conveyor means, comprising a conveyor loop entrained on said support frame over a path passing from a relatively low-lying collection area adjacent the ground to a relatively elevated discharge area thereabove, for collecting detached fruit on the inside of said conveyor loop in said collection area and for elevating such collected fruit to said discharge area, whereby collected fruit may be discharged from said harvester discharge area without interference wit the fruit tree from which the fruit is detached; wherein said fruit detachment means comprises
   a central shaft mounted generally vertically on said mobile support frame and extending from an overhead position thereon downward towards said collection area;
   impacting tines projecting from said central shaft;
   feeder means for providing a constant axial rotational motion to said central shaft hydraulically automatically synchronized with movement in either direction of said mobile support frame for smooth feeding of tree canopies passed said tines; and
   beater means for selectively superimposing an oscillatory component to said constant rotational motion, whereby said tines are oscillated in their rotational plane for impacting tree canopies to detach fruit therefrom.

2. A mechanized harvester as in claim 1, wherein:
   said harvester further includes wheels for supporting said mobile support frame and for rotating as such frame is conveyed over the ground;
   said feeder means comprises a hydraulic drive motor driven in synchronization with said wheels supporting said mobile support frame which rotate as such frame is conveyed over the ground, a relatively massive reduction gear box interconnecting said hydraulic drive motor with said central shaft, and a mounting plate for supporting said gear box and defining a torque arm therefor; and wherein
   said beater means includes an impact drive motor driving a crank arm associated therewith, and a connecting rod interconnecting said crank arm with said torque arm of said feeder means, whereby rotation of said impact drive motor rotates said crank arm which via said connecting rod transmits a rotational oscillation to said torque arm, which in turn superimposes an oscillatory component on said central shaft constant rotational motion.

3. A mechanized harvester as in claim 2, wherein:
   the amplitude of the oscillation of said impacting tines is variable by adjusting the length of one or both of said torque arm and said beater means connecting rod;
   the frequency of such impacting tine oscillation is variable by adjusting the rotational speed of said impact drive motor; and wherein
   such oscillation amplitude is preferably about plus or minus 25° about a null position of said torque arm; and such oscillation frequency is preferably in a range between about 0 to about 200 cycles per minute.

4. A machine having a multi-segment output conveyor adapted for selectively folding over such machine to improve mobility thereof, said conveyor comprising:
   a first conveyor frame segment rigidly supported on the machine in a generally horizontal position;
   a second conveyor frame segment controllably pivotable between generally horizontal and vertical positions, about a first pivot axis situated at a juncture between an outboard end of said first segment and an inboard end of said second segment;
   a third conveyor fame segment controllably pivotable about a second pivot axis situated at a juncture between an outboard end of said second segment and an inboard end of said third segment;
   stop means, carried on said second segment, for preventing said third segment from being pivoted relative said second segment beyond about 90°:
   first pivoting control means for controlling relative pivoting of said third segment about said second pivot axis; and second pivoting control means for controlling relative pivoting of said second segment about said first pivot axis;

wherein, said first and second pivoting control means may be selectively operated so that said conveyor is situated in one of an unfolded and a folded position, with said unfolded position being defined by said first and second segments residing in a common, generally horizontal plane and the outboard end of said third segment selectively positioned for desired discharge of said conveyor, and with said folded position being defined by said third segment residing perpendicular to said second segment, with said second segment placed perpendicular with said first segment, so that said first and third segments relatively reside in spaced, horizontal positions with said third segment situated in an inverted horizontal position over the machine on which said first segment is rigidly secured.

5. A machine as in claim 4, wherein:

said stop means includes a rigid member secured perpendicularly to said second segment generally near said outboard end thereof; and said second pivoting control means includes first winch means interconnected between a free end of said rigid member and a support point on the machine generally adjacent the inboard end of said first segment, whereby withdrawal of said first winch means cable pivots said rigid member and said second segment about said first pivot axis.

6. A machine as in claim 4, wherein said first pivoting control means includes a hydraulic cylinder carried generally on the underside of said first segment and interconnected with said third segment for adjusting the position of said outboard end thereof, including rotation of said third segment about said second pivot axis to a perpendicular position relative said second segment in abutment with said stop means.

7. A machine as in claim 6, wherein:

said stop means includes a rigid member secured perpendicularly to said second segment generally near said outboard end thereof; and said hydraulic cylinder is interconnected with said third segment through at least one cable of fixed length which passes over a free end of said stop means rigid member for added leverage for pivoting said third segment.

8. A fruit detachment mechanism for use with a harvesting machine to be conveyed alongside trees from which fruit are to be harvested, said mechanism comprising:

at least one impacting tine supported on an axially rotatable axis;

feeder means for axially rotating said tine support axis at a predetermined generally constant speed synchronized with movement of the harvesting machine so that canopies of trees from which fruit are to be harvested feed unimpeded passed said at least one tine; and beater means for positively imparting an oscillation displacement component of controllable, predetermined amplitude and frequency to the axial rotation of said tine support axis, so that said at least one tine also impacts such tree canopies as they pass by so as to detach fruit therefrom, such detached fruit being otherwise received and collected by the harvesting machine.

9. A fruit detachment mechanism as in claim 8, wherein said rotatable axis is supported in fixed axial location in a plane selected for corresponding engagement of typical canopies of fruit trees to be harvested, with the length of said rotatable axis further being selected in correspondence with the average height of said fruit trees to be harvested.

10. A fruit detachment mechanism as in claim 9, wherein the rotational direction and speed of said feeder means is automatically synchronized with movement of said harvesting machine.

11. A fruit detachment mechanism as in claim 8, wherein said rotatable axis comprises a generally vertical shaft with a plurality of impacting tines supported perpendicularly therefrom, such tines being padded for generally impacting main structural branches of fruit trees to be harvested with minimal damage thereto.

12. A fruit detachment mechanism for use with a harvesting machine to be conveyed alongside trees from which fruit are to be harvested, said mechanism comprising:

at least one impacting tine supported on an axially rotatable axis;

feeder means for axially rotating said tine support axis at a predetermined generally constant speed synchronized with forward speed of the harvesting machine so that canopies of trees from which fruit are to be harvested feed unimpeded passed said at least one tine; and beater means for imparting an oscillation component to the axial rotation of said tine support axis, so that said at least one tine also impacts such tree canopies as they pass by so as to detach fruit therefrom, such detached fruit being otherwise received and collected by the harvesting machine; wherein said feeder means includes a feeder drive motor and corresponding relatively large reduction gear box driven thereby, and supported on a torque arm mounting plate, for axially rotating said tine support axis; and said beater means includes a separate beater drive motor and crank arm driven thereby, and further includes a connecting rod interconnecting said beater means crank arm with said feeder means torque arm, whereby rotation of said beater means drive motor imparts an oscillatory motion to said feeder means torque arm through said connecting rod, resulting in said oscillation component of the axial rotation of said tine support axis.

13. A fruit detachment mechanism as in claim 12, wherein tree canopy impaction may be adjusted by controlling the frequency and amplitude of said oscillation component, by varying the rotational drive speed of said beater means drive motor, and by varying the length of said beater means connecting rod, respectively.

14. A fruit detachment mechanism as in claim 13, wherein said oscillation component frequency is variable generally in a range of from about 0 to about 200 cycles per minute, and the amplitude of said oscillation component preferably varies the position of said feeder means mounting plate torque arm generally about plus or minus 25° on either side of a null position thereof.

* * * * *

UNITED STATES PATENT AND TRADEMARK OFFICE
CERTIFICATE OF CORRECTION

PATENT NO. : 4,976,094

DATED : December 11, 1990

INVENTOR(S) : Williamson et al.

It is certified that error appears in the above-identified patent and that said Letters Patent is hereby corrected as shown below:

Column 15, claim 1, line 62, change "wit" to --with--.

Column 16, claim 4, line 59, change "fame" to --frame--.

Signed and Sealed this

Twenty-second Day of December, 1992

Attest:

DOUGLAS B. COMER

*Attesting Officer*  *Acting Commissioner of Patents and Trademarks*